US009785137B2

(12) United States Patent
Chu et al.

(10) Patent No.: US 9,785,137 B2
(45) Date of Patent: Oct. 10, 2017

(54) FIVE-AXIS FLANK MILLING SYSTEM FOR MACHINING CURVED SURFACE AND TOOLPATH PLANNING METHOD THEREOF

(71) Applicants: Chih-Hsing Chu, Hsinchu (TW); Hsin-Ta Hsieh, Hsinchu (TW)

(72) Inventors: Chih-Hsing Chu, Hsinchu (TW); Hsin-Ta Hsieh, Hsinchu (TW)

(73) Assignee: NATIONAL TSING HUA UNIVERSITY, Hsinchu (TW)

( * ) Notice: Subject to any disclaimer, the term of this patent is extended or adjusted under 35 U.S.C. 154(b) by 349 days.

(21) Appl. No.: 14/341,444

(22) Filed: Jul. 25, 2014

(65) Prior Publication Data

US 2015/0032250 A1 Jan. 29, 2015

(30) Foreign Application Priority Data

Jul. 26, 2013 (TW) ............................ 102126814 A

(51) Int. Cl.
*G06F 19/00* (2011.01)
*G05B 19/18* (2006.01)

(52) U.S. Cl.
CPC .. *G05B 19/182* (2013.01); *G05B 2219/35107* (2013.01); *G05B 2219/35108* (2013.01); *G05B 2219/45145* (2013.01)

(58) Field of Classification Search
CPC ........ G05B 19/182; G05B 2219/35108; G05B 2219/35107; G05B 2219/45145
See application file for complete search history.

(56) References Cited

FOREIGN PATENT DOCUMENTS

| | | |
|---|---|---|
| CN | 102298358 A | 12/2011 |
| TW | 201024941 A | 7/2010 |
| TW | 201321103 A | 6/2013 |

OTHER PUBLICATIONS

Five-Axis Flank Machining of Ruled Surfaces with Developable Surface Approximation, Chic-Hsing Chu, Jang-Ting Chen, Jul. 2005.

*Primary Examiner* — Michael D Masinick
(74) *Attorney, Agent, or Firm* — Foster Pepper PLLC

(57) ABSTRACT

This invention provides a novel tool path planning method for five-axis flank milling by imposing the constraints of curve interpolation on the tool path. The tool motion is described in the form of spline curves during its optimization-driven calculation process, instead of discrete cutter locations in CNC linear interpolation. The coefficients of the curve equations are generated by minimizing accumulated geometrical errors on the machined surface using optimization algorithms. The continuity imposed by the spline motion reduces uneven modifications of cutter locations during the optimization process. The resultant tool path yields superior.

10 Claims, 7 Drawing Sheets

| | | | |
|---|---|---|---|
| $A_1$ | 70,2,-10 | $B_1$ | 70,1,0 |
| $A_2$ | 81,6,-10 | $B_2$ | 85,5,0 |
| $A_3$ | 92,6,-10 | $B_3$ | 100,1,0 |
| $A_4$ | 109,2,-10 | $B_4$ | 109,5,0 |

| $A_1$ | 70,2,-10 | $B_1$ | 70,1,0 |
|---|---|---|---|
| $A_2$ | 81,6,-10 | $B_2$ | 85,5,0 |
| $A_3$ | 92,6,-10 | $B_3$ | 100,1,0 |
| $A_4$ | 109,2,-10 | $B_4$ | 109,5,0 |

| | |
|---|---|
| Number of cutter locations | 40 |
| Cutter edge length | 30 mm |
| Cutter radius | 2 mm |
| Number of interpolations between cutter locations | 10 |

FIG. 8

| | |
|---|---|
| Inertia weight | 0.5 |
| First learning factor | 0.5 |
| Second learning factor | 0.5 |
| Number of particles | 100 |
| Number of iterations | 100 |

FIG. 9

| | Overcut (mm) | Undercut (mm) | Total deviations (mm) |
|---|---|---|---|
| Spline constrained tool path | 9.310 | 8.401 | 17.711 |
| Traditional tool path | 11.094 | 7.528 | 18.622 |

FIG. 10

| Work material | Al 6060-T5 |
|---|---|
| Spindle speed | 10000 RPM |
| Feedrate | 500 mm/min |
| Depth of cut | 0.2 mm |

FIG. 11

| | Surface roughness $R_a$ (μm) | |
|---|---|---|
| Scanning trajectory | Constrained tool path | Unconstrained tool path |
| 1 | 3.760 | 8.751 |
| 2 | 4.435 | 9.123 |
| 3 | 6.079 | 9.790 |
| 4 | 7.134 | 11.125 |
| 5 | 6.880 | 12.910 |
| 6 | 8.293 | 13.083 |
| 7 | 11.664 | 12.921 |
| 8 | 10.543 | 15.466 |
| 9 | 13.098 | 13.402 |

FIG. 12

FIVE-AXIS FLANK MILLING SYSTEM FOR MACHINING CURVED SURFACE AND TOOLPATH PLANNING METHOD THEREOF

PRIORITY CLAIM

This application claims the benefit of the filing date of Taiwan Patent Application No. 102126814, filed Jul. 26, 2013, entitled "FIVE-AXIS FLANK MILLING SYSTEM FOR MACHINING CURVED SURFACE AND TOOLPATH PLANNING METHOD THEREOF," and the contents of which are hereby incorporated by reference in their entirety.

FIELD OF THE INVENTION

The invention is related to a five-axis flank milling system for machining a curved surface and a tool path planning method thereof, more particularly, related to the system and method utilizing the constraint of curve interpolation in the tool path planning to improve the surface quality of the machined surface.

BACKGROUND

Five-axis milling is an advanced manufacturing technology commonly used for creating complex geometries in the automobile, aerospace, mold-making, and energy industries. It offers higher shaping capability and productivity than traditional three-axis machining does, with two rotational degrees of freedom in the tool motion. Five-axis milling operations are classified into end milling and flank milling according to how the cutter removes stock material. In flank milling, the cutting edges along the cutter peripheral, generally of a cylindrical or conical shape, perform the cutting action. Tool path planning in five-axis flank milling remains challenging. Completely eliminating tool overcut and undercut is highly difficult, if not impossible. In practice, the finished surface is considered acceptable when the amount of geometrical deviations is within a given tolerance. However, effective methods of controlling the deviations are still lacking in five-axis flank machining.

For reducing the geometrical deviations (not considering the errors induced physically such as cutter deflection and tool wear) produced in five-axis flank milling, past studies have proposed numerous tool path planning methods based on optimization schemes. Various optimization methods have been proposed for adjusting cutter locations simultaneously by applying an objective function to minimize the accumulated geometrical deviations of the finished surface. These methods demonstrate the following drawbacks. The computational efficiency is low in a high-dimensional search space corresponding to a large number of cutter locations. In addition, both the tool center point and axis must be modified during the optimization process. Such modifications are particularly observable at the cutter locations around the surface regions of excessive twist. Uneven modifications of the tool motion often result in poor surface roughness on the finished part.

SUMMARY OF THE INVENTION

This invention provides a novel tool path planning method for five-axis flank milling by imposing the constraint of curve interpolation on the tool motion. The tool motion is described in the form of spline curves during its optimization-driven calculation process, instead of individual discrete cutter locations in CNC linear interpolation. The coefficients of the curve equations are generated by minimizing accumulated geometrical errors on the machined surface using optimization algorithms. The number of variables to be determined in the planning process is much lower than that of traditional methods. The computational efficiency of the planning process is thus enhanced. The continuity imposed by the spline motion reduces uneven modifications of cutter locations during the optimization process. The resultant tool path yields superior machining quality on the finished surface.

Other advantages and features of this invention will be further manifested with the following descriptions and the appended drawings.

BRIEF DESCRIPTION OF THE DRAWINGS

FIG. 8 the machining parameters in the tool path planning.

FIG. 9 shows the parameter setting in the PSO algorithm.

FIG. 10 shows the test results generated using different tool path planning methods.

FIG. 11 shows the cutting conditions in the finishing cut.

FIG. 12 shows the surface roughness estimated from a surface scanner for the surfaces machined by two different tool paths.

DETAILED DESCRIPTION

The present invention discloses a five-axis flank milling system for machining a curved surface and a tool path planning method thereof. It should be noted that the term "CNC interpolation of tool path" means generation of intermediate tool positions between consecutive discrete cutter locations on a CNC machine tool. The term "workpiece" means the part being machined. The term "curved surface" means the surface to be cut on the workpiece. The other publications or patents of the inventor, such as Taiwan patent application number 96147909, could be deemed as a basis to bring this invention in practice. The optimization scheme used in this invention can be existing methods in the prior arts, such as Genetic Algorithm, Particle Swarm Optimization, Ant Colony Optimization, Simulated Annealing, and they will not be described in detail here.

Generation of a tool path consisting of discrete cutter locations is described first to differentiate the present invention from the prior arts. A cutter location (CL) is defined by the cutter center point and cutter axis. To define each vector requires three variables in 3D space. Thus, specifying a cutter location requires six variables. Assume that a tool path consists of N cutter locations. The solution space becomes 6N-dimensional in the tool path planning of linear interpolation. N is often used as a two-digit number in the machining of a curved surface. Searching for optima in such a highly nonlinear domain is extremely difficult, if not impossible. The computational time is lengthy and the solution quality is occasionally poor; therefore, reducing the number of optimization variables is advantageous.

A feasible method for reducing the dimensionality in the solution space is to impose a motion pattern and the corresponding constraints while adjusting the cutter locations. More importantly, a continuous motion pattern produces a smooth tool path without creating excessive changes to the cutter locations during the optimization process. The part cut by the constrained tool path should exhibit higher surface quality than that cut by one that is unconstrained.

Figure 1:
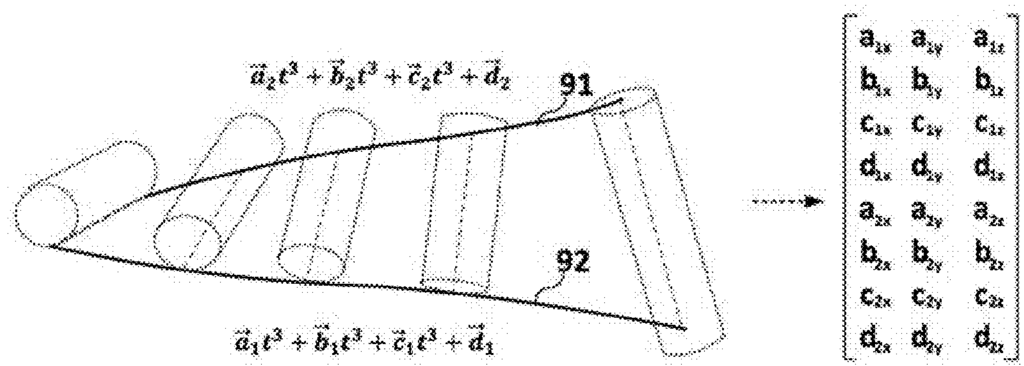
FIG. 1 illustrates a curved surface, a tool path constrained by two spline curves, and a matrix containing the coefficients of the curve equations in the present invention.

As shown in FIG. 1, a tool path is defined according to two curves along which the two tool center points move. Assume both curves are represented using a cubic polynomial equation with four coefficients. Each vector coefficient contains 3 variables. Completely describing a tool path of this form requires 24 variables. This number is much smaller than that of the tool path defined according to a set of discrete cutter locations in the prior arts. Fewer variables lead to a lower dimensional solution space when searching for optimal tool paths using a proper optimization scheme. The computational efficiency of the optimization process is thus increased and the solution quality may be improved. As in most previous studies, the objective function applied in the optimization scheme is to minimize the accumulated geometrical deviations on the finished surface. Estimation of the machined geometry is highly nonlinear without a closed-form representation. In this case, the coefficients of the curve equations can be solved by meta-heuristic optimization methods such as Genetic Algorithms, Particle Swarm Optimization, Ant Colony Optimization, or Simulated Annealing.

Figure 2:
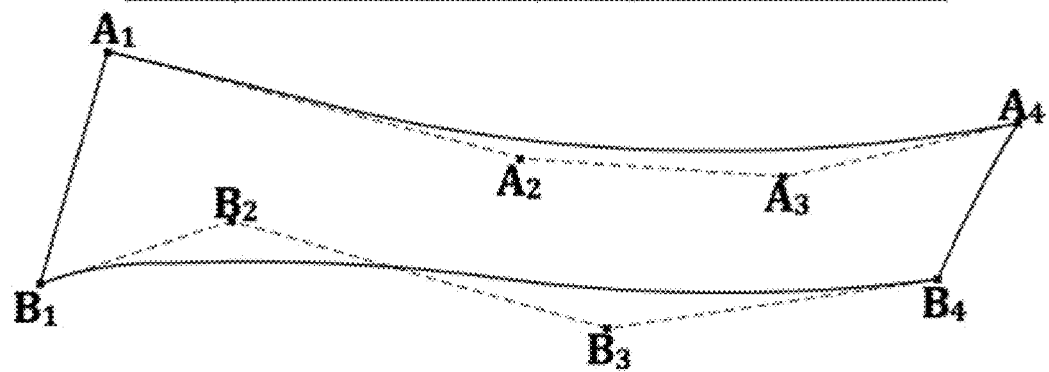
FIG. 2 illustrates a test surface and a table showing the coordinates of the control points defining the surface.

Both simulation and real machining tests have been conducted. The comparison between the linear interpolation tool path generated by the prior art and the constrained tool path produced by this invention is shown as follows. FIG. 8 lists the machining parameters in the comparison test. FIG. 9 lists the parameter setting in the PSO algorithm. A test ruled surface is defined according to two boundary curves; their control points are shown in FIG. 2. Each boundary is specified as a cubic Bézier curve in 3D space. The coordinates of each control point are present by A1 to A4 and B1 to B4.

Figure 3:
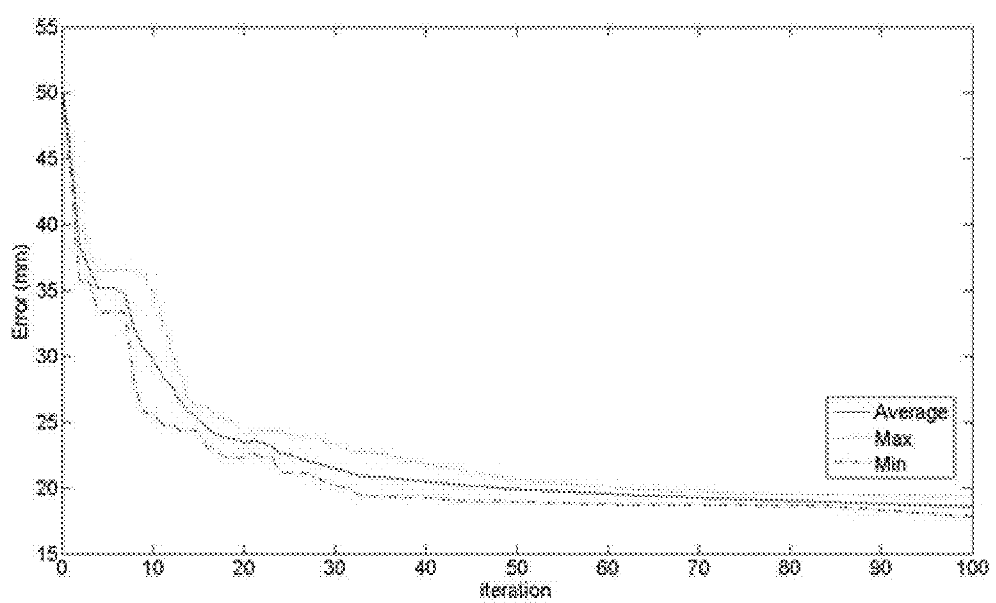
FIG. 3 illustrates the convergence curves of the optimization scheme proposed by this invention.
Figure 4:
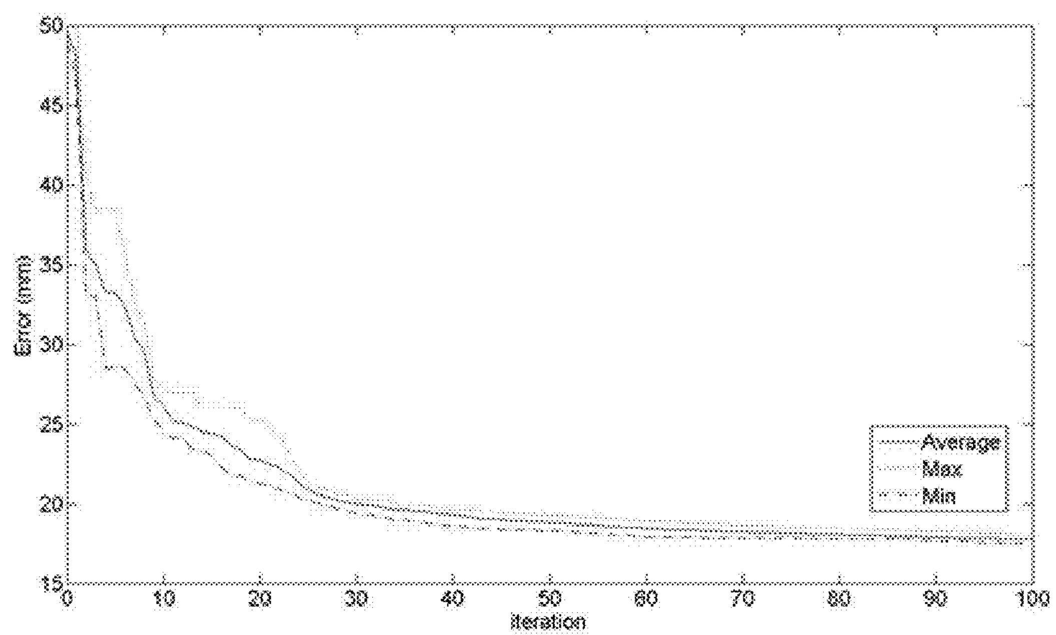
FIG. 4 illustrates the convergence curves of the optimization scheme proposed by the prior art.
Figure 5A:
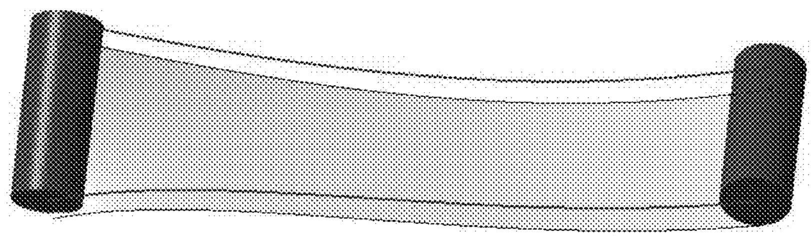
FIG. 5A illustrates a tool path constrained by two spline curves and a table showing the coordinates of the control points defining the two curves in the present invention.
Figure 5A:
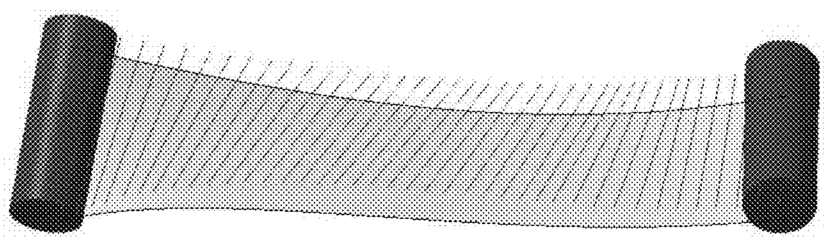
Figure 5B:
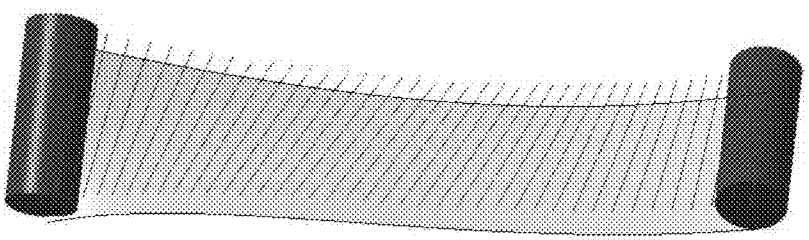
FIG. 5B illustrates the tool path generated by the prior art.

The PSO algorithm was conducted five times at the given parameter settings (FIGS. 8 and 9) to reduce the randomness involved in the search process. FIG. 3 shows the convergence curves for the best, worst, and average results in 100 iterations. All five runs converged to optimal solutions, although their processes appear slightly different. The PSO algorithm that adjusts the tool path without the motion constraint was also tested under the same conditions. FIG. 4 shows the corresponding convergence curves. FIG. 10 lists the final solutions generated using both methods. The optimal tool path constrained by spline curves produces a smaller amount of geometrical deviations than that consisting of independent cutter locations does. FIGS. 5A and 5B indicate the traditional and constrained tool paths, respectively. The spline tool path needs to be converted into G01 motions because current CNC controllers in five-axis machining do not support the spline interpolation defined by two curves. The converted motion contains 40 cutter locations, which is of the same number of cutter locations in the traditional tool path.

A cutting experiment was conducted to verify the simulation results. A Deckel-Maho nonoBlock™ five-axis CNC machine tool was used in this experiment. The moving range of the worktable is 780×560×560 mm. The maximal spindle speed is 12000 RPM. The machining operation consists of roughing and finishing cuts. The roughing cut involved using a ϕ4 ball-ended cylindrical cutter with a total length of 30 mm and a cutting length of 20 mm. This operation enabled removing most stock materials and left a material layer 0.2 mm thick on the design surface, to be removed by the finishing cut. A new tool of the same type as that used in the roughing cut was adopted in the finishing cut to eliminate the influence of tool wear. The cutting conditions in the finishing cut, suggested by the cutter provider, are summarized in FIG. 11. The cutting length can cover the entire surface along the shorter side and thus the finishing cut requires only one tool path.

Figures 6, 7:
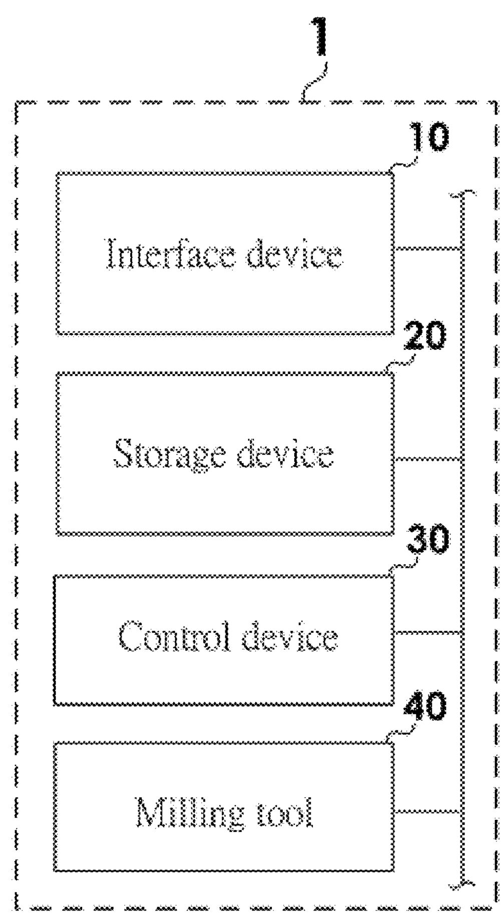
FIG. 6 illustrates two surfaces machined using traditional and spline-constrained tool paths respectively.
FIG. 7 illustrates the function blocks in the present invention.

The finished part consists of two surfaces as shown in FIG. 6. The geometrical deviations of both surfaces according to the design specifications were measured using the Form Talysurf™ PGI 1250A surface scanner. The stylus of this device moves along predefined trajectories on the surface to be measured. With respect to a reference point, the 3D coordinates can be automatically determined at discrete measurement positions along each trajectory. Nine isoparametric curves were created based on the design surface along the longer side. Each curve contains 280 measurement points of equal increments within the curve parameter along the curve. The measurement results for both surfaces are listed in FIG. 12.

This invention provides a five-axis flank milling system using the proposed tool path planning method. FIG. 7 is a schematic drawing illustrating the function blocks in the invention. In FIG. 7, the system 1 includes an interface device 10, a storage device 20, a control device 30 and a milling tool properly selected. The interface device 10 provides a data access function. The storage device 20 provides a data storage function for a predetermined machining process. The control device 30 provides controls function for executing the predetermined process.

In detail, the interface device 10 is a device that acquires the design data of a curved surface and machining instructions from the user. In one embodiment, the interface device 10 is a keyboard of a personal computer, but it is not a limitation. The interface device 10 can be a touch panel, keyboard, card reader, or other similar devices with the data input function.

In one embodiment, the storage device 20 is a hard disk, but it is not a limitation. The storage device 20 can be volatile, non-volatile memory, or a server connected to the system 1.

In one embodiment, the control device 30 is a CPU and control software running on the CPU, but it is not a limitation. The control device 30 can be a CNC controller embedded with control functions.

The followings describe the predetermined process in the storage device 20 in detail. In step S1, the interface device 10 receives a command from the user for decreasing or minimizing the geometrical errors of the curved surface after machining. The geometrical errors are the total amount of the overcut errors and the undercut errors. The command is not limited to reducing the total geometrical errors in this invention; it can be to decrease or minimize the overcut errors or the undercut errors.

In step S2, the coefficients of the curve equations that describe the optimal tool path are calculated. It should be note that the two curve equations are of degree 3 in this embodiment.

In step S3, a tool path is generated from the two curve equations.

In step S4, the tool path generated in step S3 is loaded to the control device 30 for conducting the machining process.

The invention claimed is:

1. A five axis flank milling system for machining a curved surface using a tool path on a CNC machine tool, comprising:

an interface device with a data access function;

a storage device, storing a predetermined machining process and the machining process comprising:

acquiring machining commands via the data access function;

determining two curve equations approximate to the boundaries of the curved surface and each equation corresponds to a curve along which the tool center point moves; and generating a tool path according to and constrained by the two curve equations; and a control device, connected to the interface device and the storage device, which reads and executes the predetermined machining process from the storage device.

2. The five-axis flank milling system of claim 1, wherein the machining process is to minimize the geometrical errors on the finished surface after machining; the total geometrical errors comprise the overcut errors and the undercut errors.

3. The five-axis flank milling system of claim 1, wherein the machining process is to minimize the overcut errors or the undercut errors.

4. The five-axis flank milling system of claim 1, wherein the curved equations are of degree 3 or higher.

5. The five-axis flank milling system of claim 1, further comprising a milling tool controlled by the control device to machine a workpiece along the tool path.

6. The five-axis flank milling system of claim 1, wherein the tool path is constrained by the curve equations that generates a smooth tool motion to improve the surface finish of the machined surface.

7. A tool path planning method for a five-axis flank milling system, used for generating a tool path, comprising the following steps:

accessing machining commands via the interface device;

accessing the objective of the machining process via the interface device;

calculating the coefficients of two curve equations using an optimization scheme and each curve equation describes a trajectory of one tool center point; and generating a CNC tool path according to and constrained by the curve equations;

wherein the two curve equations are approximate to the boundaries of a curved surface which desired to machine.

8. The method of claim 7, wherein the optimization process is to minimize the total geometrical errors on the finished surface after machining; the total geometrical errors comprise the overcut errors and the undercut errors.

9. The method of claim 7, wherein the curve equations are of degree 3 or higher.

10. The method of claim 7, wherein the tool path constrained by the curve equations improves the surface finish of the machined surface with a smooth tool motion.

* * * * *